June 16, 1964     W. E. LENZ     3,137,449
SIGNAL
Filed Oct. 29, 1959
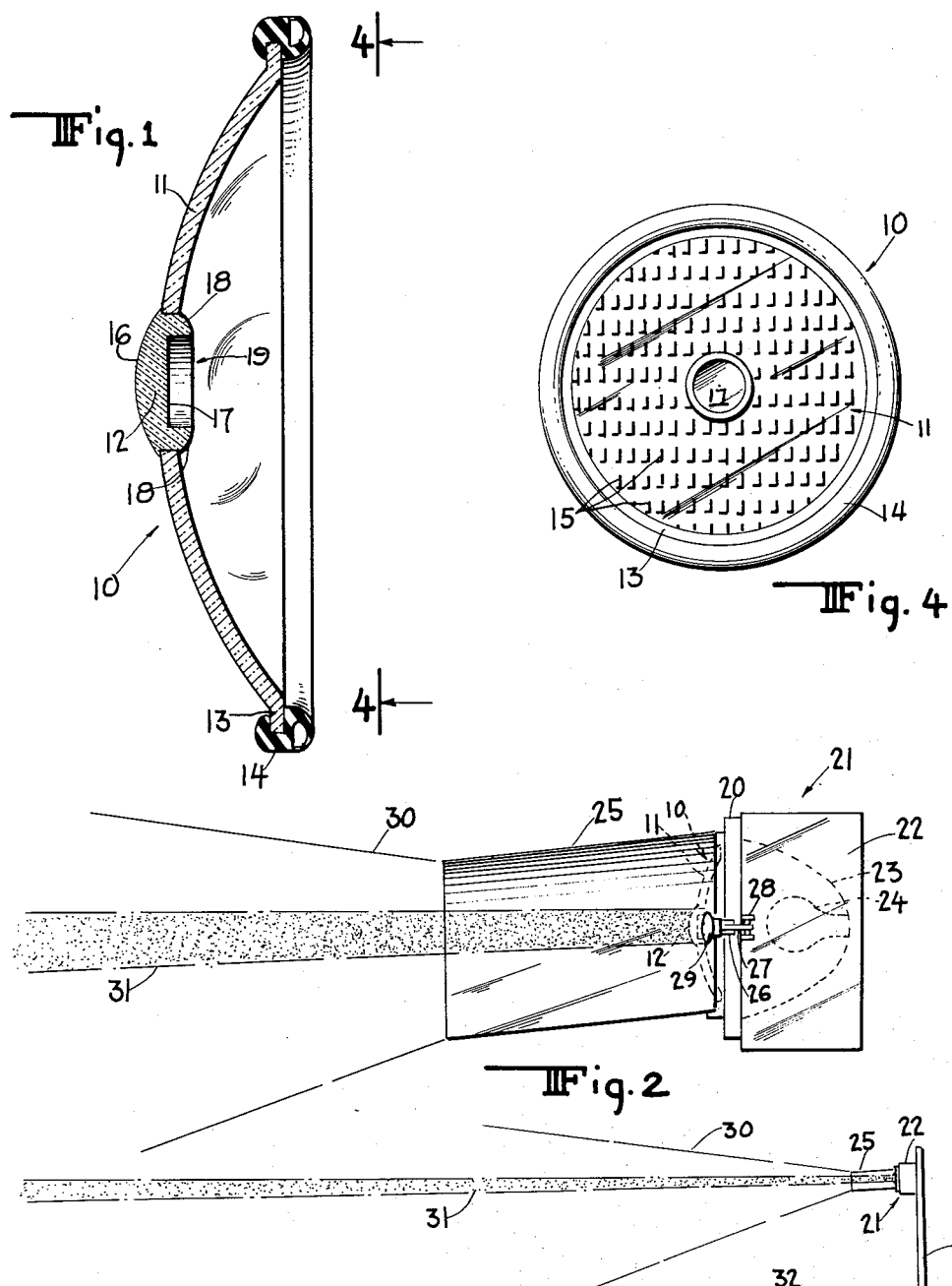
INVENTOR
WILLIAM E. LENZ
BY
Robertson & Smythe
ATTORNEYS

United States Patent Office 3,137,449
Patented June 16, 1964

3,137,449
SIGNAL
William E. Lenz, Haverstraw, N.Y., assignor to The Marbelite Company, Inc., Brooklyn, N.Y., a corporation of New York
Filed Oct. 29, 1959, Ser. No. 849,640
1 Claim. (Cl. 240—106.1)

This invention relates to a signal apparatus and more particularly to the type of signal used for motor vehicle traffic control.

The type of signal involved is normally mounted above a street or a highway and projects a beam of light through a lens in a direction so as to be visible to pedestrians and to the operators of vehicles beneath. The conventional practice in such a signal is to use a lens of a type which projects a divergent beam of light toward the roadway. Since the beam is divergent it can be seen over a range of viewing positions to the right or left of the signal when facing it and also over a range of distances in front of the signal. The beam is visible only over a limited range in front of the signal due to the rapid reduction in intensity of a divergent beam. A signal having a lens which projects only a divergent beam is not completely desirable for use on high speed roads and modern superhighways since the signal is not visible at a sufficient distance to permit the operator of the vehicle to react and operate in response to the signal. At the same time, a signal having a lens which projects only a narrow beam may not be sufficiently visible at locations very close and beneath the signal or at locations to one side or the other of the signal.

It is therefore desirable to provide a signal having a lens which provides a beam of light for observation at close range and a concentrated beam of light which is visible at long range from the signal. Such a lens enables the operator of an approaching vehicle to observe the signal with sufficient time to react to it while at the same time providing sufficient indication to vehicles which are close to the signal and to the right or left of it. In order that the signal be conveniently and unmistakenly observed, it has been found to be advantageous to have the long distance beam converge with the short range beam as the observer approaches the signal.

It is an object of this invention to provide a lens for a signal which projects both a short range and a long range beam of light.

It is also an object of the invention to provide a signal lens which has an outer portion projecting a beam of light visible only at a close range and a central portion adapted to project a narrow beam of light visible at a greater distance from the signal.

It is a further object of this invention to provide a signal lens which projects two beams of light at an angle to one another.

More specifically, the present invention is applicable to vehicle traffic signals of the described character which must be visible to an observer at both near and distant locations. The signal lens includes a central portion surrounded by an outer portion. The central portion may consist of a condensing lens adapted to project a long range beam of light. The outer portion may be a Fresnel-type lens adapted to project a short range beam of light.

In another aspect of the invention, the lens may include an inner portion in the form of a condensing lens projecting a long range beam and a surrounding outer portion projecting a short range beam. To insure the dual ranges of visibility, the beams may be oriented at an angle to each other.

This and other objects, features, and advantages of the invention will become apparent from the following detailed description and drawing which are merely exemplary.

In the drawings:
FIG. 1 is a side elevational sectional view of the lens.
FIG. 2 is a side elevational view of the signal showing the lens projecting the divergent and the concentrated beams of light.
FIG. 3 is a side elevational view of the signal mounted above a highway.
FIG. 4 is a sectional view of the lens taken along the line 4—4 in FIG. 1.

Referring to the drawings in detail, and initially to FIG. 1 thereof, the lens for the signal is there generally identified by reference numeral 10. Lens 10 may be of circular shape having an outer portion 11 and a central portion 12. The periphery of outer portion 11 is provided with flange 13 about which is mounted gasket 14 which may be of the endless channel-shaped type. Outer portion 11 may be a Fresnel-type lens as shown in FIG. 4. In a Fresnel-type lens the surface is formed with a multiplicity of prism elements 15 which collectively focus the light passing through the lens into a projected beam.

Central portion 12 is a condensing-type lens which projects a concentrated pencil-beam of light. Central portion 12 includes an outer convex surface 16 and an inner plane surface 17 to form a plano-convex lens. Central portion 12 may be formed with a partially convex rear surface 18 surrounding cavity 19 the end surface of which is inner plane surface 17. With such a configuration, rays of light proximate to the major axis of the lens pass through inner plane surface 17 and then through the remainder of the lens while rays of light more remote from the central axis strike convex rear surface 18 and then are refracted within the lens. It is evident that lens 10 may be formed as an integral unit including both the outer and central portion together or the outer portion may be fabricated separately and the separate portion subsequently mounted within it.

Lens 10 may be mounted within an opening in door 20 of signal 21. Lens 10 and gasket 14 are attached to door 20 by conventional locking means. Door 20 is attached to housing 22 which contains reflector 23 and lamp 24. Visor 25 is mounted on outer surface of door 20 and serves to shield lens 10 from dust and the elements as well as stray light which could reflect from the outer surfaces of lens 10 and interfere with its signal indications. Door 20 is held in a closed position with respect to housing 22 by means of latch-type lug 26 which is engaged by eye bolt 27 pivoted in lug 28. Wing nut 29 engaged with eye bolt 27 is installed to establish the required closing force for door 20.

As shown in FIG. 2 the light from lamp 24 passes through outer portion 11 of lens 10 and is projected as beam 30 which is divergent in both the vertical and horizontal directions. The light from lamp 24 passing through the central portion 12 of lens 10 is focused to project a concentrated narrow beam 31. As shown in FIG. 3 signal 21 may be supported above surface 32 in such a manner that lens 10 is positioned in a substantially vertical plane. Divergent beam 30 after passing through inclined visor 25 projects outwardly from signal 21 and is visible by an observer on surface 32 in the immediate vicinity of signal 21. Since beam 30 is divergent in the horizontal plane it is also visible to an observer standing right or left of signal 21. Narrow beam 31 may be projected at an angle slightly below the horizontal so as to carry over a great distance from signal 21. Consequently an observer approaching at a great distance from the signal 21 will first see narrow beam 31. The high intensity of narrow beam 31 insures its visibility. As the observer approaches signal 21, he enters the region of divergent beam 30 with the result that narrow beam 31 gradually blends into the light admitted by divergent beam 30. The gradual blending of the beams prevents any mistake in identifying the proper signal after passing from a long range to a short range observation point.

In order to assure that narrow beam 31 carries a great distance as compared to divergent beam 30, central portion 12 may be adapted to project narrow beam 31 so that its axis is at an angle to the axis of divergent beam 30. In some applications it may be advantageous to provide a different color for narrow beam 31 as compared to beam 30. For example, a long distance warning signal may be provided by employing an amber colored central portion 12 while the short range indication of stop or danger could be provided by a red outer portion 11. With this configuration the observer would experience the gradual transformation from a yellow warning signal to a red danger signal.

It is evident that lens 10 may be fabricated from any glass or plastic material having good optical characteristics. In the configuration for projecting beams of different colors, lens 10 may be formed as an integral unit with different colors of glass or plastic material for each portion or it may be formed as a composite unit, employing central and outer portions separately prepared from different colored glass or plastic materials.

It is to be understood that the described exemplary embodiment is merely intended for the purpose of illustration and that the principles of this invention are not to be limited thereto except as defined in the appended claim.

What is claimed is:

In a traffic signal having a door with an opening therein and a lamp positioned in alignment with said opening, a lens secured in said opening, said lens comprising means for projecting a diverging short range beam of light and a substantially horizontal and parallel long range beam of light with the periphery thereof blended with and fully encompassed by said short range beam for the full projection of the latter, said means including an outer lens portion in the form of a segment of a hollow sphere having a radius of curvature substantially greater than the overall depth of the lens, and having a Fresnel-type surface construction to project said diverging short range beam, and a single central plano-convex outward lens portion of relatively thicker dimensions located substantially in a central concentric position upon said hollow spherical segment to project said long range beam, said central lens portion comprising a plano-convex outward element surrounded about its periphery by a convex inward surface, the convex surfaces of said central lens portion being of a more pronounced curvature than the curvature of said spherical segment.

References Cited in the file of this patent

UNITED STATES PATENTS

| | | |
|---|---|---|
| 1,589,370 | Conover | June 22, 1926 |
| 1,942,136 | Carter et al. | Jan. 2, 1934 |
| 2,244,737 | Stewart | June 10, 1941 |
| 2,254,962 | Harris | Sept. 2, 1941 |
| 2,282,167 | Cullman | May 5, 1942 |
| 2,287,221 | Alm | June 3, 1942 |
| 2,469,080 | Rosin et al. | May 3, 1949 |
| 2,853,599 | Kleegl | Sept. 23, 1958 |
| 2,975,268 | Craig et al. | Mar. 14, 1961 |

FOREIGN PATENTS

| | | |
|---|---|---|
| 288,694 | Great Britain | Apr. 10, 1928 |
| 531,185 | Great Britain | Dec. 31, 1940 |